Patented Apr. 3, 1923.

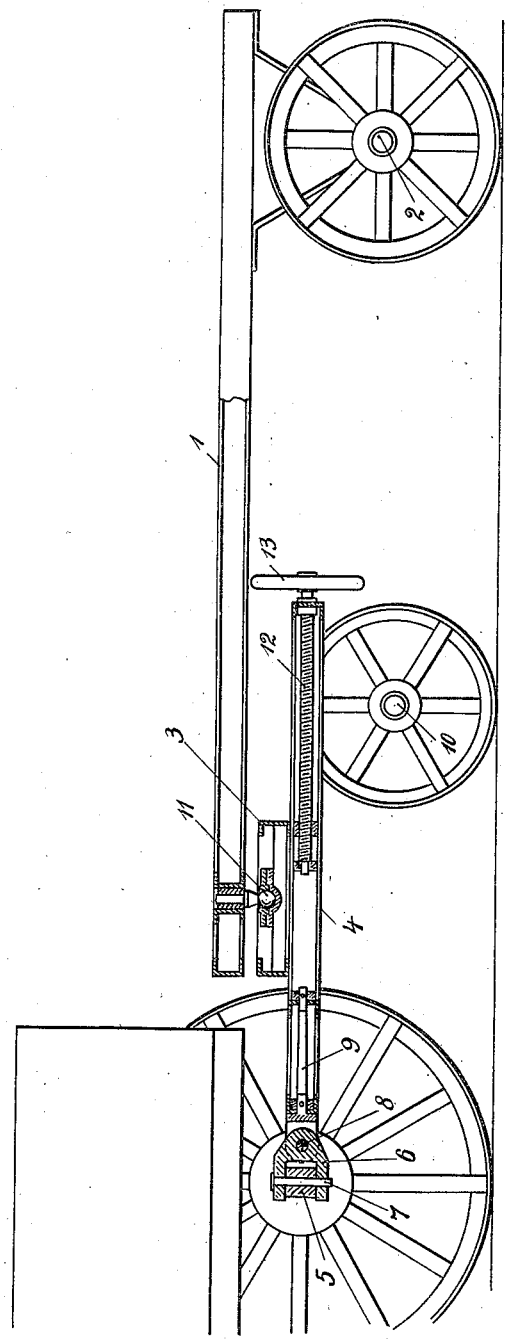

1,450,554

UNITED STATES PATENT OFFICE.

HERMANN OSCAR KREISSLE, OF ANSBACH, GERMANY, ASSIGNOR TO ANSBACHER MOTORENFABRIK KARL BACHMANN AKTIENGESELLSCHAFT, OF ANSBACH, GERMANY.

TRAILER.

Application filed April 8, 1921. Serial No. 459,817.

*To all whom it may concern:*

Be it known that I, HERMANN OSCAR KREISSLE, a citizen of the German Republic, residing at Ansbach, Germany, have invented certain new and useful Improvements in Trailers, of which the following is a specification.

The weight of the trailers is as a rule taken up entirely by its own axles. There have however become known also trailers in which part of the weight is transferred to the driving wheels of the tractor in order to increase the friction from weight.

This invention has for its object to make adjustable the part of the weight of the trailer to be transferred upon the driving wheels of the tractor and to render it possible that the trailer can be used as independent vehicle without any other auxiliary means. With this object in view a supporting point of the trailer platform is adjustably arranged upon the frame which effects the connection between the trailer and the tractor.

In order that the invention may be clearly understood I shall proceed to describe the same with reference to the accompanying drawing on which a trailer is shown partly in longitudinal section which is coupled with the rear axle of a tractor.

The platform 1 of the trailer is supported by its rear axle 2 constructed as usual and by the bogie 3 which is constructed like a carriage adapted to slide upon the frame 4 which forms the connection between the rear axle 5 of the tractor and the front axle 10 of the trailer.

The tractor shown by way of example belongs to that class of motor vehicles in which the axle 5 of the driving wheels does not revolve with the wheels. The connection between the axle 5 and the frame 4 is effected by the link 6 which is connected by a vertical bolt 7 with the axle 5 and by a horizontal bolt 8 with the eyelet of a stud 9 which is situated in the frame 4 in the direction of the longitudinal axis of the vehicle so that it can revolve but not move in longitudinal direction.

By this coupling between the axle 5 of the tractor and the front axle 10 of the trailer the required liberty of movement is ensured for frame 4 to enable the same to participate in the movement of the front axle 10 of the trailer during the drive, which front axle is either elastically or rigidly connected with said frame. For the same reason the support of the platform 1 upon the slidable carriage 3 consists of a ball headed conical bolt 11.

The displacement of the bogie 3 in longitudinal direction and the securing of the same in its position upon frame 4 is effected by the spindle 12 which can be operated by the hand wheel 13.

In the position shown the bogie 13 or the ball headed bolt 11 stands approximately at the middle between the driving axle of the tractor and the front axle of the trailer. The driving axle of the tractor must therefore take up approximately half of the load which presses upon the front axle of the trailer whereby its adhesion weight is increased in a determined proportion to the load of the trailer.

If the trailer has to be uncoupled from the tractor the bogie 3 is brought by means of spindle 12 into a position in which the bolt 11 which transfers the load of the trailer upon the bogie is standing perpendicularly over the front axle of the trailer. If necessary, the bogie is even brought slightly behind the front axle so that by the load pressure of the platform of the trailer the net weight of the frame 4 may be compensated and the frame be balanced. In this position the trailer can be uncoupled from the tractor or coupled with the same or used as an independent vehicle.

The idea of the invention can be applied also to single axle trailers or to trailers which have more than two axles. In the first case the frame 4 ought to be longer and the bogie 3 must serve as platform. In the latter case a two-axle bogie would have to be substituted for the front axle of the trailer.

I claim:—

Improved device for coupling the trailer with the tractor comprising in combination with the platform of the trailer, a downwardly projecting vertical ball-headed conical bolt, a slidable carriage mounted upon the ball head of said bolt serving as bogie for the platform of the trailer, a supporting frame for connecting said trailer with the tractor, means for hingedly fixing the front end of said frame to the rear axle of the tractor, a horizontal screw spindle in the frame, a hand wheel for operating said spindle, and means for connecting said bogie with said spindle so that it can be displaced in longitudinal direction upon said supporting frame by the action of the spindle for the purpose to make adjustable the part of the load of the trailer to be transferred upon the driving wheels of the tractor and to enable the trailer to be used as an independent vehicle without auxiliary means.

In testimony whereof I affix my signature.

HERMANN OSCAR KREISSLE.